Oct. 27, 1970 J. H. TOLAR 3,536,859

COMBINATION RADIO AND TAPE PLAYER SYSTEM WITH INTEGRATED CONTROLS

Filed Feb. 8, 1967 2 Sheets-Sheet 1

INVENTOR.
JAMES H. TOLAR

BY Louis Bernat

INVENTOR.
JAMES H. TOLAR
BY Louis Bernat
Atty.

United States Patent Office 3,536,859

Patented Oct. 27, 1970

3,536,859
COMBINATION RADIO AND TAPE PLAYER SYSTEM WITH INTEGRATED CONTROLS

James H. Tolar, Mayfield Heights, Ohio, assignor to Tenna Corporation, a corporation of Ohio Filed Feb. 8, 1967, Ser. No. 614,629
Int. Cl. G11b *31/00*
U.S. Cl. 179—100.11 5 Claims

ABSTRACT OF THE DISCLOSURE

The disclosure describes a structurally and functionally integrated combination radio and tape player system in which all of the controls perform the same or similar functions in each operational mode and in which the radio tuning indicator is combined with the door and cartridge receiving guideway to provide a functional and decorative control panel.

This invention relates to an improved audio entertainment system for use in compact environments where it is not practical for the listener to devote much attention to operation of the system; and, more particularly, to a novel radio and magnetic tape sound system which is compatible with automotive environments.

Recently the use of pre-recorded magnetic tapes stored in easily-handled cartridges has become increasingly popular with a growing number of people who desire to listen to high-quality, uninterrupted musical selections while riding in automobiles and other vehicles.

Initially, the demand for tape player systems was met by offering an instrument constructed solely for the purpose of reproducing signals on pre-recorded magnetic tapes. Two such tape players are described in copending patent applications, Ser. No. 561,635, filed June 29, 1966, entitled Universal Tape Recorder and Playback Instrument and Ser. No. 610,346, filed Jan. 19, 1967, entitled Universal Cartridge-Type Tape Recorder and Playback Instrument.

While these tape players provide excellent results, they are in a sense uneconomical because many of their components are already found in other electronic instruments in a vehicle such as the radio.

Thus, in an automobile containing a separate radio and a separate tape player there are two separate power supplies, two separate audio amplifiers, two sets of controls and, sometimes, two different loudspeaker systems. As only the radio or only the tape player is used at any given time, it would be advantageous to combine the radio and the tape player as a single, unified system in which an optimum number of components could be shared for either function.

A number of attempts have been made to combine tape players and radios to overcome these disadvantages and excessive costs and size which are inherent with two separate systems. These attempts have not been entirely successful because of the failure to sufficiently integrate the components of each of the systems contained in the instrument. Thus separate controls for similar functions may be provided for each system or control panel space may be wasted by not fully utilizing the area reserved for the cartridge receiving guideway.

Accordingly, a principal object of this invention is to provide a compact, economical audio entertainment system for listening to programs broadcast by radio or recorded on magnetic tape.

These and other object features and advantages of the invention will become more readily apparent from the following description of a preferred embodiment of an audio entertainment system containing an AM–FM radio and a universal, cartridge-type tape player in which.

Figure 1:
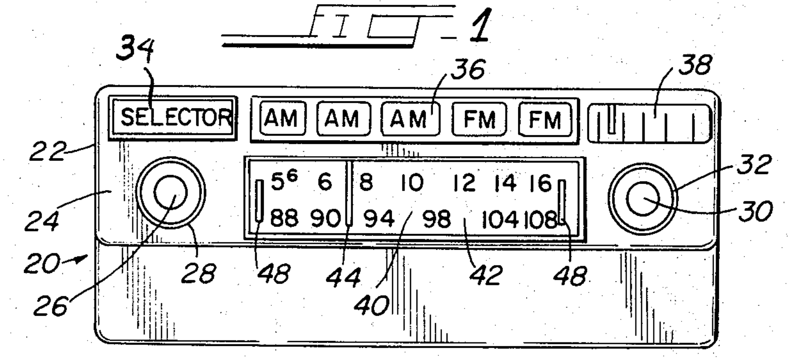
FIG. 1 is a view of the front panel of the system particularly illustrating the placement of the controls and indicators.

A front view of an audio entertainment system 20 constructed according to this invention is shown in FIG. 1. The system is housed within a cover 22 which includes a control panel 24 of relatively small dimension to facilitate the mounting of the system in an automobile dashboard or other surface in which space may be at a premium.

Located on the control panel 24 are all of the controls and indicators which are required to operate the system. The controls include a combination on-off-volume control 26, a tone control 28, a tuning control 30, a stereo balance control 32, a tape track selector switch 34 and a set of five pushbuttons 36 used for selecting either the AM or the FM radio reception mode and for setting the tuned circuits of the radio to one of five predetermined frequencies.

The indicators located on the control panel 24 are a tape track indicator 38 for indicating which tracks the tape recorder transducer is positioned to replay and a radio tuning indicator 40 which indicates the radio reception frequency.

The construction of the control panel 24 represents one of the main improvements of the invention which facilitated successful integration of the components into a unified entertainment system. By integrating the control panel components, a smaller, more economical, better looking and easier operating system was attained.

In developing a functional yet decoratively appealing control panel, it was necessary to conceive of some means for accepting a tape cartridge which would be compatible with operation of the system as a radio. Characteristically cartridge-type tape players contain a guideway having an entrance for the insertion of a tape cartridge and a door hinged near the entrance to prevent the entry of foreign matter when a cartridge is not in the guideway.

Generally, the area of the door comprises about one-half the area of the control panel. Various attempts have been made to decorate the door such as by employing attractive metal finishes or printing decorative patterns on the door, but these efforts are not considered satisfactory because the door still looks like a blank space into which some missing or optional part should be added. In essence, the presence of the door imparts an unfinished appearance to the control panel.

In addition to being unsightly, the presence of the guideway and door make it difficult to include a slide-rule-type tuning dial for the radio on the control panel because there is very little space left for such an indicator.

An analysis of the problem of finding a means for incorporating a relatively large guideway and door and a relatively large tuning indicator indicated that the dimensions of the door were approximately those which would be required for the tuning indicator. From this the idea of incorporating the tuning indicator 40 into a door 42 hinged in the cartridge guideway entrance was conceived.

In the illustrated embodiment, the combination door and means for indicating the frequency to which the radio signal detecting means is tuned comprises a transparent faceplate 42, a pointer 44, a backing plate 46 used to support the pointer and provide the desired visual effect, a pair of bumpers 48 for contacting the surfaces of a cartridge when it is inserted in the guideway so as to prevent scratching of the faceplate and two series of numbers, each located along a line on the door, which cooperate with the pointer 44 to indicate the frequency to which the radio signal detecting means is tuned. In the illustrated embodiment, one series of numbers, 5.5, 6, 8 . . . 16, indicates the frequency in kilohertz to which the radio is tuned in the AM reception mode and the other series, 88, 90 . . . 108, indicates the frequency in megahertz to which the radio is tuned in the FM mode.

Figure 3:
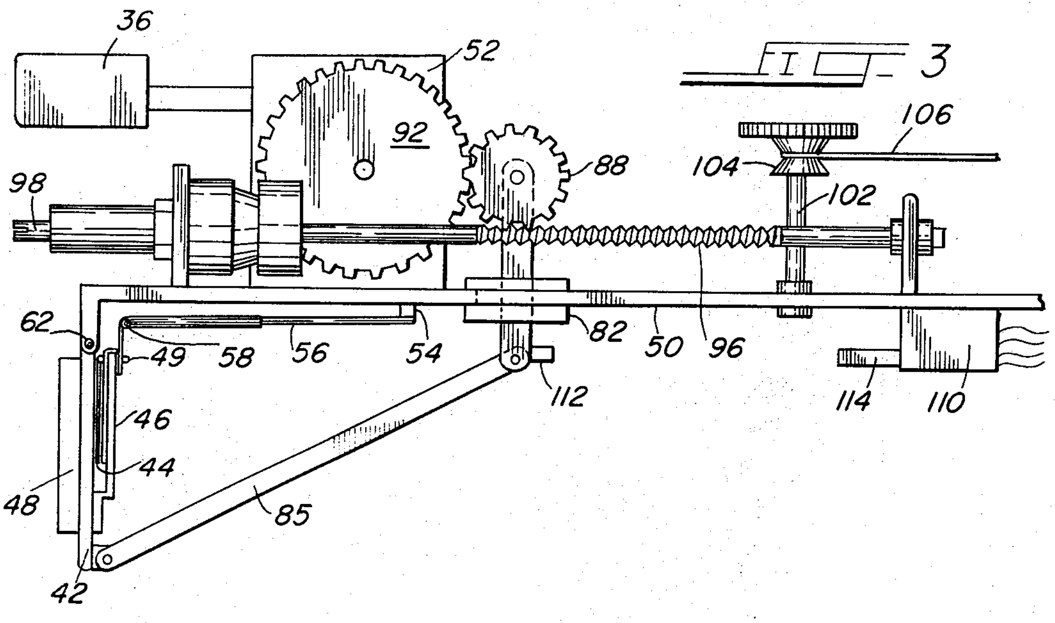
FIG. 3 is a side view of a portion of the integrated control system when the system is reproducing radio broadcasting signals.

As best seen in FIG. 3, the pointer 44 is slidably secured to the backing plate 46 by means of a rivet 49 which passes through a longitudinal slot in the backing plate that extends from the number 5.5 to the number 16 on the backing plate. Thus the backing plate, the slot, the pointer and the series of numbers cooperate so that the pointer may slide along the backing plate with the series of numbers located along the locus of the pointer's path as shown in FIG. 1 to indicate the radio reception frequency.

The position of the pointer 44 is controlled by linkage which connects it to variable tuning elements which are mounted on the top of chassis member 50 within shield 52. The linkage comprises a rotary shaft 54 whose angular position is a function of the setting of the tuning elements, a telescoping rod 56 secured to the shaft 54 at one end and hinged to the pointer 44 at the other end by hinge 58. Thus, as the setting of the tuning elements is changed, the pointer 44 slides along the backing plate to indicate the new radio reception frequency.

As the indicator 40 is both functional as well as decorative, it lends a finished or completed appearance to the instrument when no cartridge is in the guideway.

Figure 4:
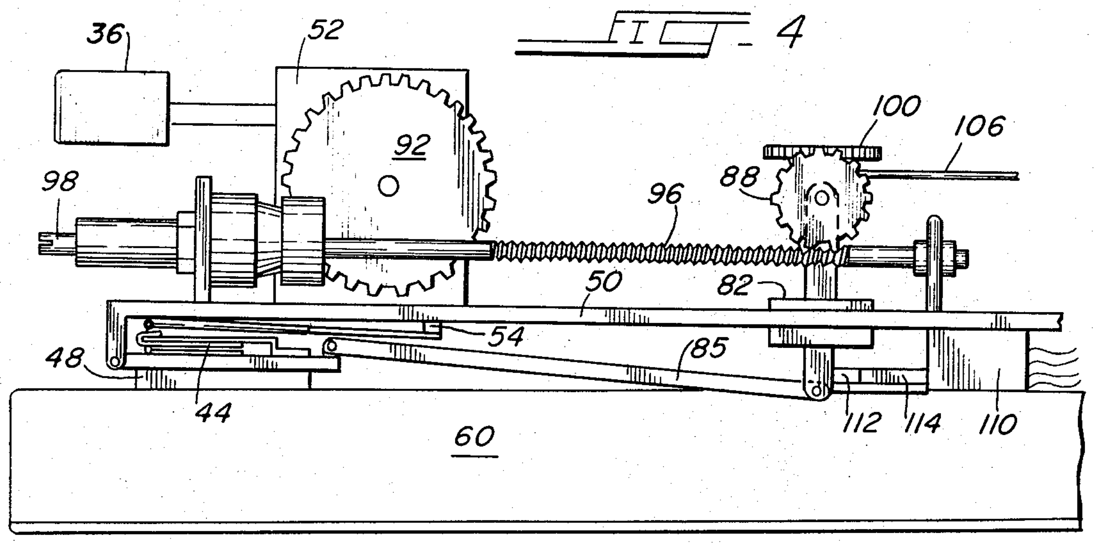
FIG. 4 is a side view of the elements of FIG. 3 showing their relationship when the system is reproducing signals recorded on magnetic tape.

When a cartridge 60 is inserted into the guideway, it pushes the door open to the position shown in FIG. 4. As the telescoping rod 56 is hinged to the pointer 44 by hinge 58, the door 40 may be swung upward against the chassis member 50 to permit the entry of the cartridge 60 into the guideway.

When the cartridge 60 is removed from the guideway, hinge springs (not shown) which form a part of hinge 62 which secures the indicator and guideway door 40 to the chassis member 50 bias the door to its closed position as shown in FIG. 3.

In this manner, it is possible to integrate the functions and structures of the guideway and door and the radio frequency tuning indicator to obtain a compact and economical system.

In addition to providing a more compact and economical system, an object of this invention is to provide a functionally integrated and convenient instrument which requires very little effort or attention to operate. This criterion requires that the system operate automatically and that the few controls which must be operated be constructed in such a manner that each performs an identical or similar function in each of the sound reproduction modes. For example, the same control knob should control the volume regardless of whether the operator is listening to a radio broadcast or a selection from a prerecorded tape. This feature is not present when separate instruments, each having a unique control panel configuration, are used.

If two controls which perform the same basic function are provided at different locations, the operator is often confused as to the location of the proper knob to turn. Where the operator is primarily occupied with driving an automobile, even a moment's distraction in search for the right control causes at the least irritation and almost always a definite safety hazard. For this reason, the controls must be fully integrated so that they provide the same responses for each operational mode.

In the audio entertainment system 20 which is described, the on-off-volume control 26, the tone control 28, the stereo balance control 32 and the tuning control 30 meeting the criterion of full functional integration. For the first three of these controls this is achieved by connecting these controls to a common audio amplifier which is shared by the radio signal detecting means and the magnetic tape signal detecting means. The functional integration of the tuning control 30 is achieved by means of a novel mechanical transmission system which will be described.

As stated above, the radio signal detecting means includes tuning elements housed in shield 52 which determine the radio frequency to which the system is tuned. The setting of the tuning elements may be changed manually by either operating one of the pushbuttons 36 or by turning the tuning control 30. The tuning control 30 allows the operator to "fine-tune" the radio signal detecting means when the system is in the radio signal reception mode.

It is also necessary to provide a "fine-tuning" control for a tape player. As more fully described in copending patent application Ser. No. 610,346 a fine tuning control is used to correct errors in register between the transducer and the tracks on the prerecorded tapes containing the signals to be reproduced. These errors are caused by defects in the tapes or the cartridges, changes in recording formats, wear and other causes more fully described in the copending patent application Ser. No. 610,346.

Figure 2:
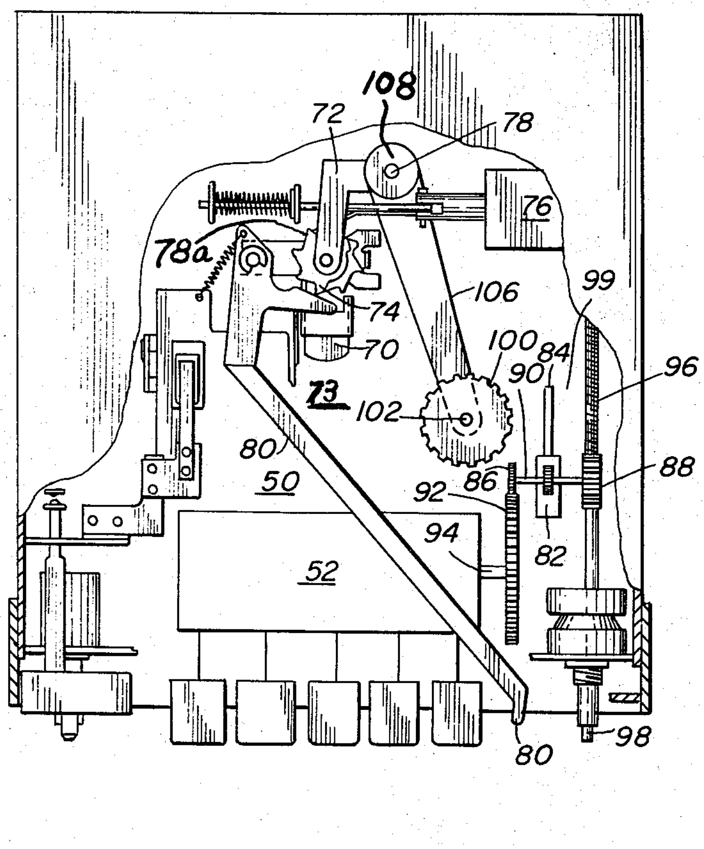
FIG. 2 is a top view of the system showing the construction of a portion of the integrated control system.

As shown in FIG. 2, the means for detecting signals recorded on magnetic tape include a transducer 70 slidabiy secured to a transducer support plate 72 adjacent the guideway 73. The relative position of the transducer 70 with respect to the support plate 72 is determined by an index wheel 74 which has a vertical bottom cam surface which causes the transducer 70 to move up or down in discrete movements as the index wheel is rotated by solenoid 76 to attain approximate register with the tracks on the magnetic tape which contain the desired signals. The index wheel also contains a horizontal cam surface **78*a* which cooperates with pointer 80 to provide a visual indicator of the relative transducer-track position on indicator 38**.

Fine tuning of the transducer 70 with respect to the magnetic tape tracks is attained by rotating a screw 78 threaded to the chassis member 50 and journaled in the support plate 72 to cause the support plate and the transducer to move up or down by small increments on the order of .001 inch as the screw 78 is turned.

The complete functional integration of the tuning control 30 is achieved by a novel combination which cooperates with the guideway door 40 to selectively transfer the operation of the control shaft 30 from the radio tuning elements to the magnetic tape transducer turning screw 78 when a cartridge is inserted in the guideway.

Referring to FIGS. 2 and 3, when the system 20 is in the radio reception mode, the door 40 closes the guideway as no cartridge is present. The door is mechanically coupled to a bearing journal 82 slidably secured to the chassis mmeber 50 within a slot 84 by a link 85. The bearing journal supports a pair of gears 86 and 88 fixed to axle 90 so that rotation of gear 88 causes gear 86 to rotate. Gear 86 meshes with a gear 92 which is secured to a control shaft 94 which can be rotated to change the setting of the tuning elements. The gear 88 is meshed with thread 96 cut into control shaft 98 which supports the tuning control knob 30.

In order to "fine-tune" the radio tuning capacitor, the operator need only apply manual rotary force to the tuning control knob 30 and this force, in turn, is transmitted by mechanical transmission 99 comprising the control shaft 98, thread 96, gears 86 and 88, bearing journal 82 and gear 92 secured to the tuning element control shaft 94 to change the radio reception frequency.

When a cartridge is inserted into the guideway, the door 40 swings upward to the position shown in FIG. 4. The link 85 causes the bearing journal 82 to slide back along the slot 84 until the gear 86 meshes with a gear 100 journaled on a shaft 102 secured to the chassis member 50. The gear 100 contains a pulley 104 which rotates with it. A dial cord 106 is wound around the pulley 104 and then around a pulley 108 fixed to the transducer fine tuning screw 78.

To "fine-tune" the transducer 70, the operator applies manual rotary force to the knob 30 and the force in turn is transmitted by the mechanical transmission through control shaft 98, thread 96, gears 86, 88 and 100, pulley 104, dial cord 106 and pulley 108 to the screw 78.

Thus by inserting a cartridge, the two-position mechanical transmission 99 which is mechanically coupled to the door by link 85 is shifted from a first position connecting the control knob 30 to the tuning capacitor control shaft 94 when the door 40 closes the entrance of the guideway into a second position to connect the control knob 30 to the transducer position means screw 78 when the door is held open by the presence of a cartridge in the guideway.

In addition to providing complete functional integration for the tuning control 30, the mechanical transmission also cooperates with the door 40 and a double throw electric switch 110 to switch the operation of the system circuits from detecting radio signals to detecting signals recorded on magnetic tape. When the door 40 is opened by a cartridge a tab 112 located on the bearing journal 82 pushes button 114 of switch 110 to operate the switch from a first position which permits the operation of the circuit as a radio signal detector to a second position to permit the operation of the circuit as a magnetic tape recorded signal detector.

One embodiment of an audio entertainment system, for reproducing radio broadcasting signals and selections recorded on magnetic tape, which is structurally and functionally integrated in accordance with the concepts of this invention has been described. A number of modifications to the illustrated embodiment are practical. For instance, the pointer 44 can be positioned along the door by means of a dial cord drive instead of the telescoping rod 56 and the pointer can be attached to the backing plate 46 by some other means. Many different linkage and transmission constructions are also practical. Though differing in physical appearance from the system that has been described, these embodiments, nevertheless, are within the scope of the invention as defined by the following claims:

What is claimed is:

1. A combination radio and tape player system comprising:
(a) means for detecting radio signals;
(b) means for detecting signals recorded on a magnetic tape stored in a cartridge, comprising:
 (1) a magnetic tape signal transducer located adjacent the guideway for detecting signals recorded on tracks located on magnetic tape; and
 (2) means for moving the transducer through small increments to obtain proper register between the transducers and the tracks in response to the application of mechanical force;
(c) a cartridge receiving guideway having an entrance for the insertion of a cartridge into the guideway;
(d) a door hinged near the entrance of the guideway, the door containing means for indicating the frequency to which the radio signal detecting means is tuned;
(e) means for closing the guideway entrance with the door when a cartridge is not in the guideway;
(f) a pointer slidably secured to the door;
(g) a series of numbers located on the door along the locus through which the pointer may slide which cooperate with the pointer to indicate the frequency to which the radio signal detecting means is tuned;

(h) manually operable tuning means mechanically coupled to the pointer, said manually operable tuning means comprising a control knob for manually operating the tuning means; and
(i) means for connecting the tuning means control knob to the transducer positioning means so that manual force applied to the control knob is transmitted to the transducer moving means when a cartridge is in the guideway.

2. The system of claim 1 wherein the means for connecting the control knob to the transducer positioning means comprise:
a two-position mechanical transmission mechanically coupled to the door, the transmission being shifted into a first position to connect the control knob to the tuning means when the door closes the entrance of the guideway and into a second position to connect the control knob to the transducer positioning means when the door is held open by the presence of a cartridge in the guideway.

3. The system of claim 2 comprising in addition:
means for switching the operation of the system circuits from detecting radio signals to detecting signals recorded on magnetic tape when a cartridge is inserted into the guideway.

4. The system of claim 3 wherein the switching means comprise:
a double-throw electric switch mechanically coupled to the door, the switch being thrown to a first position to permit the operation of the circuit for detecting radio signals when the door closes the entrance of the guideway and into a second position to permit the operation of the circuit for detecting signals recorded on magnetic tape when the door is held open by the presence of a cartridge on the guideway.

5. A combination radio and cartridge-type tape player system comprising:
(a) means for detecting radio signals including manually operable tuning means;
(b) a cartridge receiving guideway having an entrance for the insertion of a cartridge containing magnetic tape into the guideway;
(c) means for detecting signals recorded in tracks located on magnetic tape stored in a cartridge including:
 (1) a magnetic tape signal transducer located adjacent the guideway for detecting signals recorded in the tracks, and
 (2) means for obtaining proper register between the transducer and the tracks by moving the transducer through small increments in response to the application of mechanical force
(d) a door hinged near the entrance of the guideway containing:
 (1) a pointer, driver by the tuning means slidably secured to the door, and
 (2) a series of numbers located on the door along the locus through which the pointer may slide which cooperate with the pointer to indicate the frequency to which the radio signal detecting means is tuned;
(e) means for closing the guideway entrance with the door when a cartridge is not in the guideway;
(f) a manually operable turning control knob;
(g) a two-position mechanical transmission driven by the control knob and mechanically coupled to the door, the transmission being shifted into a first position to connect the control knob to the tuning means when the door closes the entrance of the guideway and into a second position to connect the control knob to the transducer positioning means when the door is held open by the presence of a cartridge in the guideway; and
(h) a double-throw electric switch mechanically coupled to the door and electrically connected to both the radio signal detecting means and the magnetic tape signal detecting means, the switch being thrown to a first position to permit the operation of the circuit for detecting radio signals when the door closes the entrance of the guideway and into a second position to permit the operation of the circuit for detecting signals recorded on magnetic tape when the door is held open by the presence of a cartridge in the guideway.

References Cited

UNITED STATES PATENTS

| | | | |
|---|---|---|---|
| 2,536,123 | 1/1951 | Berry | 179—100.11 |
| 2,662,975 | 12/1953 | Schwarz | 250—14 |
| 3,400,227 | 9/1968 | Lear et al. | 179—100.11 |

BERNARD KONICK, Primary Examiner

R. F. CARDILLO, Jr., Assistant Examiner